United States Patent
Volochniuk et al.

(10) Patent No.: US 10,750,156 B2
(45) Date of Patent: Aug. 18, 2020

(54) THREE-DIMENSIONAL CAMERA FOR CAPTURING IMAGE TO PROVIDE VIRTUAL REALITY

(71) Applicant: Samsung Electronics Co., Ltd, Suwon-si (KR)

(72) Inventors: Andrii Volochniuk, Kiev (UA); Konstantin Morozov, Kiev (UA); Sun-kyung Kim, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/075,089

(22) PCT Filed: Apr. 26, 2016

(86) PCT No.: PCT/KR2016/004365
§ 371 (c)(1),
(2) Date: Aug. 2, 2018

(87) PCT Pub. No.: WO2017/135514
PCT Pub. Date: Aug. 10, 2017

(65) Prior Publication Data
US 2019/0045171 A1 Feb. 7, 2019

(30) Foreign Application Priority Data
Feb. 2, 2016 (KR) .................. 10-2016-0012894

(51) Int. Cl.
*H04N 13/243* (2018.01)
*H04N 5/232* (2006.01)
(Continued)

(52) U.S. Cl.
CPC ........... *H04N 13/243* (2018.05); *G06T 19/00* (2013.01); *G06T 19/20* (2013.01); *H04N 5/2224* (2013.01);
(Continued)

(58) Field of Classification Search
CPC combination set(s) only.
See application file for complete search history.

(56) References Cited

U.S. PATENT DOCUMENTS 6,141,034 A 10/2000 McCutchen
2003/0030636 A1 2/2003 Yamaoka
(Continued)

FOREIGN PATENT DOCUMENTS

CN 101055494 A 10/2007
CN 101627623 A 1/2010
(Continued)

OTHER PUBLICATIONS

Video glasses with 6DOF head tracking made with 3 IR LED_ https://www.youtube.com/watch?v=xOgqzN3YSgM.
(Continued)

*Primary Examiner* — Michael E Teitelbaum

(57) ABSTRACT

Provided is a three-dimensional (3D) camera for capturing an image for providing virtual reality (VR), the 3D camera including a plurality of cameras; and a position sensor configured to track a position of the 3D camera, wherein the plurality of cameras are arranged at each vertex of a polyhedron, and at least three cameras are arranged at each vertex of the polyhedron.

6 Claims, 11 Drawing Sheets

(51) Int. Cl.
*G06T 19/00* (2011.01)
*G06T 19/20* (2011.01)
*H04N 5/222* (2006.01)
*H04N 13/282* (2018.01)
*H04N 13/296* (2018.01)
*H04N 13/239* (2018.01)
*H04N 13/00* (2018.01)

(52) U.S. Cl.
CPC ....... *H04N 5/23238* (2013.01); *H04N 13/239* (2018.05); *H04N 13/282* (2018.05); *H04N 13/296* (2018.05); *G06T 19/006* (2013.01); *H04N 2013/0088* (2013.01)

(56) References Cited

U.S. PATENT DOCUMENTS

| | | | |
|---|---|---|---|
| 2007/0126863 | A1 | 6/2007 | Prechtl et al. |
| 2010/0066860 | A1 | 3/2010 | Tsurumi |
| 2010/0265177 | A1 | 10/2010 | Fujimoto et al. |
| 2011/0109726 | A1 | 5/2011 | Hwang et al. |
| 2013/0329016 | A1 | 12/2013 | Hwang et al. |
| 2015/0199849 | A1 | 7/2015 | Cho et al. |
| 2017/0118458 | A1* | 4/2017 | Gronholm .............. G03B 37/04 |
| 2017/0223368 | A1* | 8/2017 | Abbas .................. H04N 19/146 |

FOREIGN PATENT DOCUMENTS

| | | |
|---|---|---|
| CN | 101872469 A | 10/2010 |
| EP | 3404915 A1 | 11/2018 |
| KR | 10-2012-0016896 A | 2/2012 |
| KR | 10-2013-0058782 A | 6/2013 |
| KR | 10-2013-0092522 A | 8/2013 |
| KR | 10-2014-0146889 A | 12/2014 |
| WO | 2015/155406 A1 | 10/2015 |
| WO | 2017135514 A1 | 8/2017 |

OTHER PUBLICATIONS

F1 2012 on the Oculus Rift Pt. 1 / Head Tracking with 6 DOF_ https://www.youtube.com/watch?v=DIkarGwxKpk.
Gazepoint GP3 Real-time Heatmap Demo_https://youtu.be/tM2tlAi-0lw.
Hands-On with Tobii Eye Tracking (CES 2015)_https://www.youtube.com/watch?v=BfsCGSsbSg8.
International Search Report dated Oct. 24, 2016 in connection with International Patent Application No. PCT/KR2016/004365.
Written Opinion of the International Searching Authority dated Oct. 24, 2016 in connection with International Patent Application No. PCT/KR2016/004365.
Supplementary European Search Report dated Dec. 6, 2018 in connection with European Patent Application No. 16 88 9492, 9 pages.
China National Intellectual Property Administration, "Notification of the First Office Action," Application No. CN 201680080840.0, dated Nov. 1, 2019, 19 pages.

* cited by examiner

POSITION MOVEMENT FROM A TO B

| POLYHEDRON | DIHEDRAL ANGLE | VERTEX ANGLE |
|---|---|---|
| TETRAHEDRON | 70.53° | 70.53° |
| HEXAHEDRON | 90° | 90° |
| OCTAHEDRON | 109.47° | 60.90° |
| DODECAHEDRON | 116.57° | 108° |
| ICOSAHEDRON | 138.19° | 60.108° |

THREE-DIMENSIONAL CAMERA FOR CAPTURING IMAGE TO PROVIDE VIRTUAL REALITY

CROSS-REFERENCE TO RELATED APPLICATIONS AND CLAIM OF PRIORITY

This application is a 371 of International Application No. PCT/KR2016/004365 filed Apr. 26, 2016, which claims priority to Korean Patent Application No. 10-2016-0012894 filed Feb. 2, 2016, the disclosures of which are herein incorporated by reference in their entirety.

BACKGROUND

1. Field

The present disclosure relates to a three-dimensional (3D) camera that captures an image for providing virtual reality (VR).

2. Description of Related Art

Recently, devices that provide three-dimensional (3D) images to a user by using a virtual reality (VR) device have been developed. VR devices can sense a movement of a user and can provide a changed image according to the movement of the user.

A 3D camera that captures a 3D image is needed to provide a 3D image to a user. 3D cameras capture an image according to a movement of a user within a space and store the captured image. Because 3D cameras should capture and store an image every time a user moves, the 3D cameras should include a storage space.

SUMMARY

Provided is a three-dimensional (3D) camera that captures an image for providing virtual reality (VR).

According to an aspect of the present disclosure, a three-dimensional (3D) camera for capturing an image for providing virtual reality (VR) includes a plurality of cameras; and a position sensor configured to track a position of the 3D camera, wherein the plurality of cameras are arranged at each vertex of a polyhedron, and at least three cameras are arranged at each vertex of the polyhedron.

A three-dimensional (3D) camera according to an embodiment has a polyhedron shape and may capture an image by using two-dimensional (2D) cameras located at each vertex of the polyhedron shape.

The 3D camera according to an embodiment may store an index distribution map and the captured image in a memory according to a position of the 3D camera.

The 3D camera according to an embodiment may store an index and an image in the memory only when the 3D camera is located at a unique position.

DETAILED DESCRIPTION

Embodiments now will be described more fully hereinafter with reference to the accompanying drawings.

Figure 1:
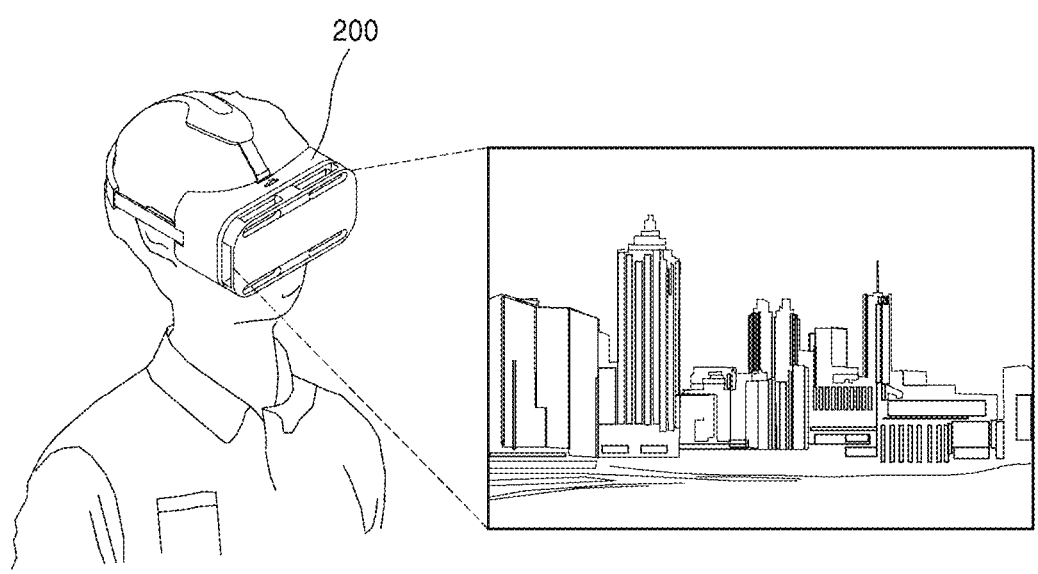
FIG. 1 is a diagram for explaining an example of virtual reality (VR).

FIG. 1 is a diagram for explaining an example of virtual reality (VR). Referring to FIG. 1, a user wears a VR device 200. The VR device 200 provides the user with an image of a space different from a space where the user is present. For example, the user may wear the VR device 200 indoors, and the VR device 200 may display to the user an image of a city in a foreign country.

The VR device 200 may display an image according to a movement of the user. The user may move his/her entire body or only his/her head. When the entire body of the user moves, the VR device 200 may adjust a size of an image according to a direction in which the user moves. When the head of the user moves, the VR device 200 may display another image according to a direction in which the head of the user moves.

The VR device 200 may be referred to as a head mounted display or a headset.

Figure 2:
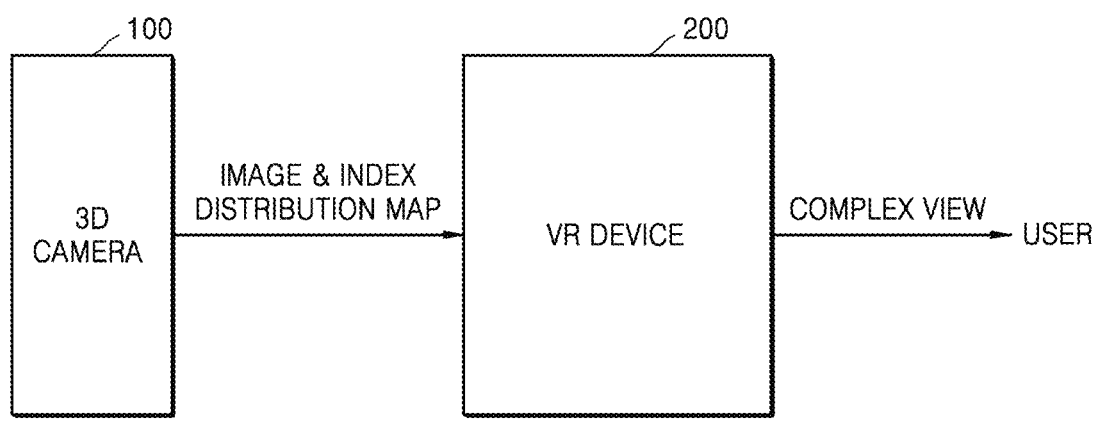
FIG. 2 is a diagram for explaining a relationship between a three-dimensional (3D) camera and a VR device.

FIG. 2 is a diagram for explaining a relationship between a 3D camera and a VR device. Referring to FIG. 2, a 3D camera 100 captures an image and transmits the captured image to the VR device 200. The 3D camera 100 transmits a position of the 3D camera 100 when capturing an image, positions of vertexes of the 3D camera 100, and an index to the VR device 200. The index represents a virtual polyhedron formed by the vertexes. The index may be a combination of symbols, characters, or numbers for identifying the virtual polyhedron. The 3D camera 100 may generate an index distribution map including indexes and positions of vertexes, and may transmit the index distribution map to the VR device 200.

The 3D camera 100 may generate the index distribution map and store the generated index distribution map in a memory. The index distribution map includes a unique index and the positions of the vertexes of the 3D camera 100. When the position of the 3D camera 100 is changed, the 3D camera 100 stores positions of changed vertexes of the 3D camera 100, and an index in the memory.

The 3D camera 100 stores only a unique index in the memory, and does not store any non-unique index. The unique index is an index that does not belong to another index stored in the memory. In other words, an index represents a virtual polyhedron, and polyhedrons may overlap each other. Indexes representing non-overlapping polyhedrons are unique indexes, and only the unique indexes may be stored in the memory. For example, when a first polyhedron does not overlap a second polyhedron stored in the memory, an index representing the first polyhedron is a unique index. The 3D camera 100 stores only an image captured at a position indicated by the unique index, in the memory. When the position of the 3D camera 100 is changed, the 3D camera 100 updates the index distribution map. The 3D camera 100 determines whether the position of the index is unique, and updates the index distribution map only when the index is a unique index. The index distribution map represents a position relationship between unique indexes.

The 3D camera 100 transmits the index distribution map and images to the VR device 200.

The VR device 200 receives the images and the index distribution map from the 3D camera 100. The VR device 200 generates a complex view by using the images and displays the complex view to the user.

The VR device 200 determines the complex view according to a position of the user. The VR device 200 searches for an index closest to a current position of the user or an index including the current position of the user. The VR device 200 may generate the complex view by using images captured at a found index and may display the generated complex view.

Figure 3:
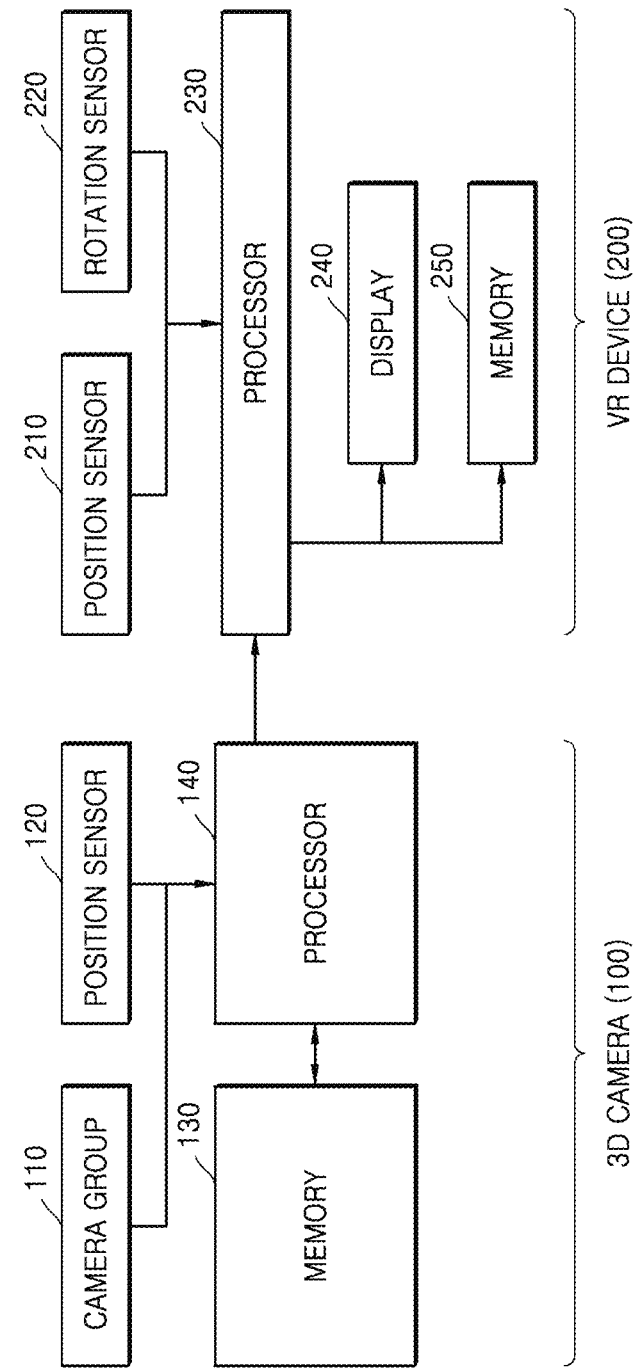
FIG. 3 is a block diagram for explaining a device for and a method of providing VR, according to an embodiment.

FIG. 3 is a block diagram for explaining a device for and a method of providing VR, according to an embodiment. Referring to FIG. 3, the method of providing VR includes the operations of capturing an image and providing the captured image.

The 3D camera 100 includes a camera group 110, a position sensor 120, a memory 130, and a processor 140. The camera group 110 includes a plurality of cameras. The camera group 110 is located at each of the vertexes of the 3D camera 100. The camera group 110 may include at least three cameras. Three cameras are located at a single vertex, and respective fields of view of the three cameras overlap each other. The fields of view of cameras located at the same vertex overlap each other, and the fields of view of cameras located at different vertexes also overlap each other. Overlapping portions thereof are used to generate a panorama view.

The position sensor 120 senses a position of the 3D camera 100. The position sensor 120 transmits, to the processor 140, information representing a position of the 3D camera 100 according to a movement of the 3D camera 100. For example, the position sensor 120 may be a global positioning system (GPS) or an inertial measurement unit (IMU).

The memory 140 stores an image captured by the camera group 110 and information of the position sensed by the position sensor 120.

The memory 130 receives the image from the camera group 110 and receives the position information from the position sensor 120. The processor 140 may determine an image, position information, or an index that is to be stored in the memory 130. For example, the processor 140 may store a unique image and a unique index in the memory 130. The unique image is an image captured at a location of the unique index. In other words, the unique image is an image captured by the camera group 110 at a location where polyhedrons formed by the vertexes of the 3D camera 100 do not overlap each other.

The processor 140 generates an index distribution map. The index distribution map may represent a location to which the 3D camera 100 has moved. The index distribution map includes positions of the vertexes of the 3D camera 100 and an index.

The 3D camera 100 transmits position information of the 3D camera 100 and images to the VR device 200. The 3D camera 100 may transmit the index distribution map and unique images to the VR device 200.

The VR device 200 includes a position sensor 210, a rotation sensor 220, a processor 230, a display 240, and a memory 250. The position sensor 210 senses a position of the VR device 200. The position sensor 210 transmits, to the processor 140, information representing a position of the VR device 200 according to a movement of the VR device 200. For example, the position sensor 210 may be a GPS or an IMU.

The rotation sensor 220 senses a rotation of the VR device 200. A user may wear the VR device 200 and rotate his or her head about x, y, and z axes. As the head of the user rotates, the VR device 200 also rotates. The rotation sensor 220 senses the rotation of the VR device 200 and measures an angle at which the user's head rotates about the x, y, and z axes. The rotation sensor 220 transmits the measured angle to the processor 230.

As the user moves, the processor 230 generates an image that is to be displayed to the user. The processor 230 generates the image, based on data received from the position sensor 210 and the rotation sensor 220. The processor 230 may generate the image, based on a movement direction, a movement distance, a rotation direction, and a rotation angle of the user.

The processor 230 generates a complex view by synthesizing images received from the 3D camera 100. The processor 230 selects some of the images received from the 3D camera 100 as the user moves, and generates a complex view by the selected images.

The display 240 displays the complex view generated by the processor 230.

The memory 250 stores the images and the index distribution map received from the 3D camera 100. The memory 250 may store the complex view and also store information about the movement of the user.

Figure 4:
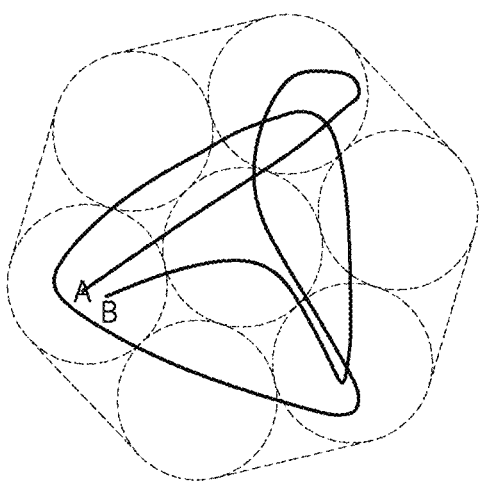
FIG. 4 is a diagram illustrating a positional movement of a 3D camera.
Figure 5:
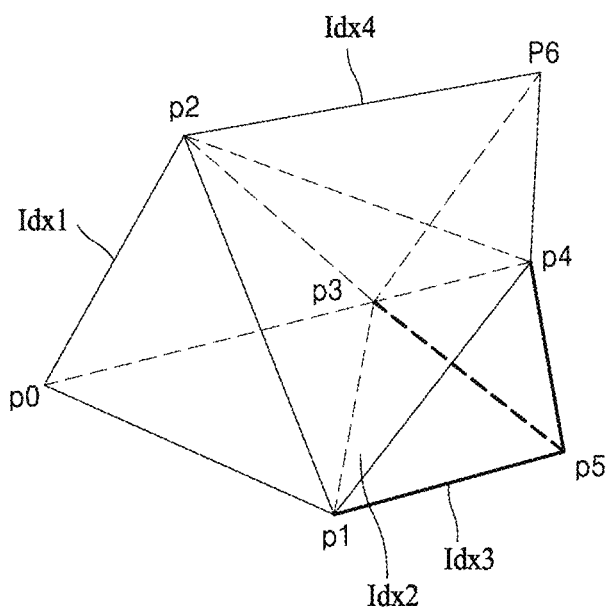
FIG. 5 is a diagram for explaining a method performed by a 3D camera, of generating indexes.
Figure 6:
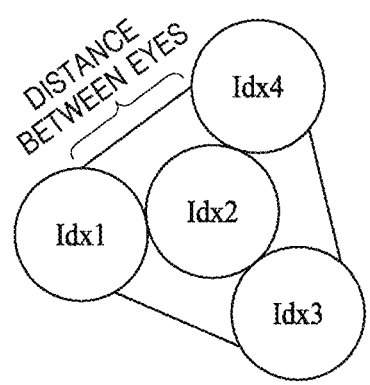
FIG. 6 is a diagram illustrating areas covered by indexes as circles.

FIGS. 4 through 6 are diagrams for explaining a method of generating an index distribution map, according to an embodiment. Referring to FIGS. 4 through 6, the 3D camera 100 may generate an index distribution map including only unique indexes.

FIG. 4 is a diagram illustrating a positional movement of a 3D camera. The 3D camera 100 may move along a line that connects a point A to a point B. The circles shown in FIG. 4 do not overlap each other. A new circle is generated at a location where the position of the 3D camera 100 is changed and the new circle does not overlap an existing circle. The circles indicate boundaries of images generated by the 3D camera 100.

FIG. 5 is a diagram for explaining a method performed by a 3D camera to generate indexes. The 3D camera 100 stores images captured at vertexes p0 through p6. The vertexes p0 through p6 may represent positions of 2D cameras. The 2D cameras may capture images when the 3D camera 100 moves from the point A to the point B. However, the 3D camera 100 may store only images captured at the vertexes p0 through p6. A distance between the vertexes p0 through p6 may be close to a distance between the two eyes of the user. For example, an average distance between the two eyes of users may be equal to the distance between the vertexes p0 through p6.

The 3D camera 100 generates indexes idx1 through idx4. Tetrahedrons represented by the indexes idx1 through idx4 do not overlap each other. A first index idx1 is an index for identifying the leftmost tetrahedron, a second index idx2 is an index for identifying a middle tetrahedron, a third index idx3 is an index for identifying a tetrahedron on a right bottom side, and a fourth index idx4 is an index for identifying a tetrahedron on a left upper side.

FIG. 6 is a diagram illustrating areas covered by indexes as circles. FIG. 6 illustrates circles corresponding to the polyhedrons of FIG. 5. The circles represent areas of images captured at positions respectively indicated by the indexes idx1 through idx4.

The circles do not overlap each other. A distance between the circles may be close to a distance between the two eyes of the user. The 3D camera 100 may store only images of a non-overlapping area, and a unique index is allocated to the non-overlapping area.

Figure 7:
FIG. 7 is a diagram for describing the shape of a 3D camera.

FIG. 7 is a diagram for describing the shape of a 3D camera. Referring to FIG. 7, the 3D camera 100 may be a tetrahedron, a hexahedron, an octahedron, a dodecahedron, an icosahedron, or the like. Although 5 examples of the shape of a 3D camera are illustrated in FIG. 7, the 3D camera 100 may be any of various shapes of polyhedrons. At least three cameras may be positioned at each of the vertexes of a polyhedron.

Figure 8:
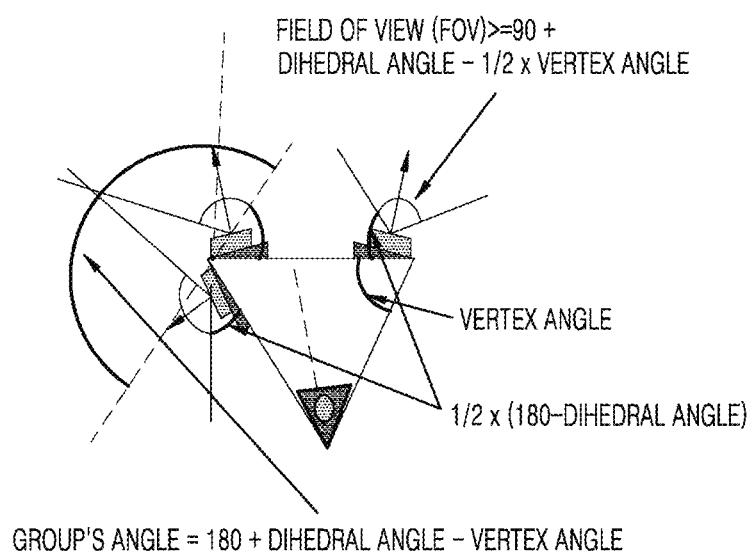
FIG. 8 is a diagram for explaining a method of calculating the field of view of a camera located at a vertex.

FIG. 8 is a diagram for explaining a method of calculating the field of view of a camera located at a vertex.

Field of View (FOV)>=90+Dihedral angle−½×Vertex angle

The dihedral angle is an angle obtained when two planes in a polyhedron meet each other, and the vertex angle is an angle obtained when two edges in one plane meet each other. For example, when the 3D camera 100 is a tetrahedron, the field of view of a camera positioned at each vertex of the tetrahedron may be calculated as follows:

Field of view>=90+70.53−½×60=130.53.

Accordingly, the field of view of the camera positioned at each vertex of the tetrahedron may be 130.53° or greater.

Group's angle=180+Dihedral angle−Vertex angle

The group's angle represents a field of view covered by a single vertex. For example, the group's angle of a group of cameras (at least three cameras) positioned at each vertex of the tetrahedron may be calculated as follows:

Group's angle=180+70.53−60=190.53.

Accordingly, the group's angle of the group of cameras positioned at each vertex of the tetrahedron may be 190.53°.

Fields of view and group's angles of other polyhedrons may be calculated using the same method as described above.

Figure 9:
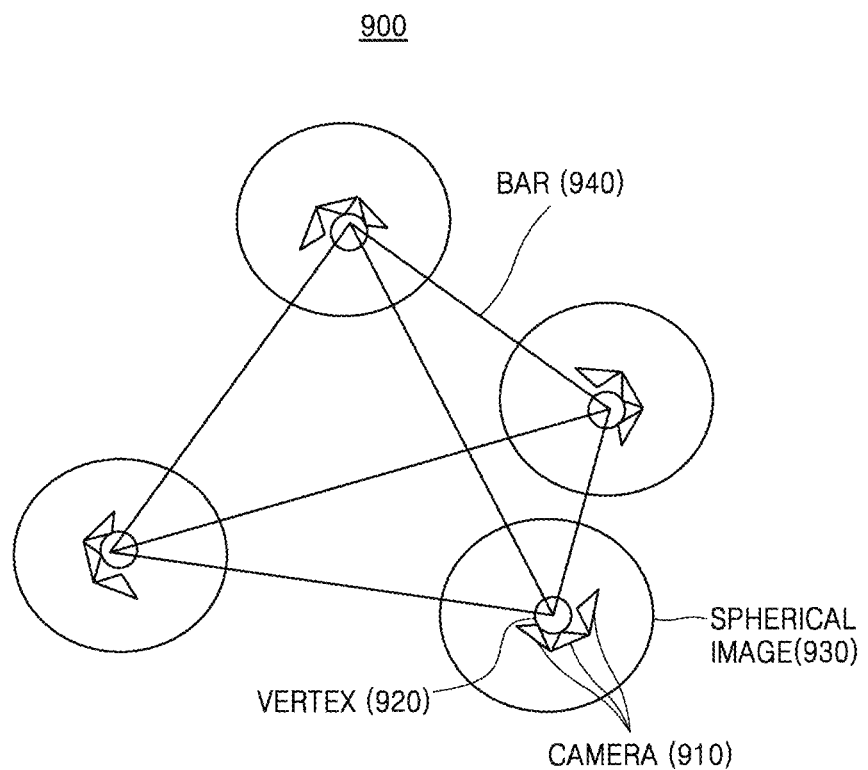
FIG. 9 is a diagram for explaining a 3D camera according to an embodiment.

FIG. 9 is a diagram for explaining a 3D camera 900 according to an embodiment. The 3D camera 900 is a tetrahedron, and includes four vertexes 920. Three cameras 910 are positioned at each vertex 920. The three cameras 910 capture images and the captured images overlap each other. A field of view covered by the three cameras 910 may be 180° or greater. A spherical image 930 is generated by synthesizing the images captured by the three cameras 910. Spherical images 930 captured at different vertexes 920 may overlap each other.

The 3D camera 900 includes bars 940 that connect the four vertexes 920 to each other. A length of each bar 940 corresponds to a distance between the two eyes of a person. In other words, the length of each bar 940 may be a length close to the distance between the two eyes of a person.

As calculated above with reference to FIG. 7, because the 3D camera 900 is a tetrahedron, the field of view of each camera 910 is 130.53°, and an angle formed by the three cameras 910 located at each vertex 920 is 190.53°.

Figure 10:
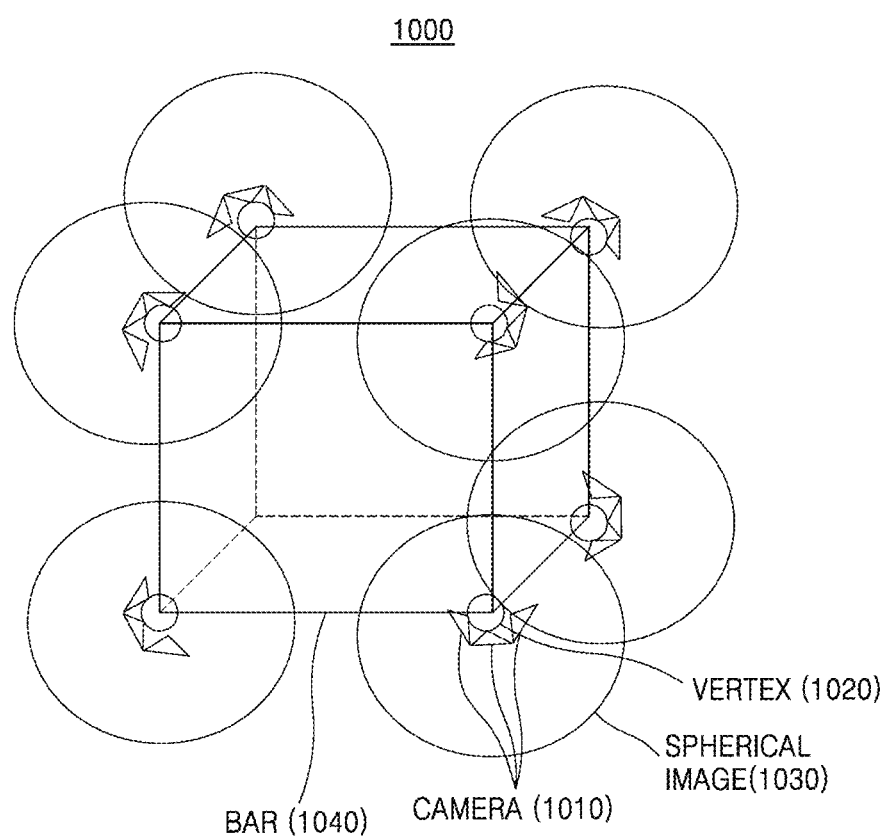
FIG. 10 is a diagram for explaining a 3D camera according to an embodiment.

FIG. 10 is a diagram for explaining a 3D camera 1000 according to an embodiment. The 3D camera 1000 has an octahedron shape and includes eight vertexes 1020. Three cameras 1010 are positioned at each vertex 1020. The three cameras 1010 capture images and the captured images overlap each other. A spherical image 1030 is generated by synthesizing the images captured by the three cameras 1010.

The 3D camera 1000 includes bars 1040 that connect the eight vertexes 1020 to each other. A length of each bar 1040 corresponds to a distance between the two eyes of a person. In other words, the length of each bar 1040 may be a length close to the distance between the two eyes of a person.

As calculated above with reference to FIG. 7, because the 3D camera 1000 is has an octahedron shape, the field of view of each camera 1010 is 135°, and an angle formed by the three cameras 1010 located at each vertex 1020 is 210°.

Field of view>=90+90−½×90=135.

Group's angle=180+90−60=210.

Figure 11:
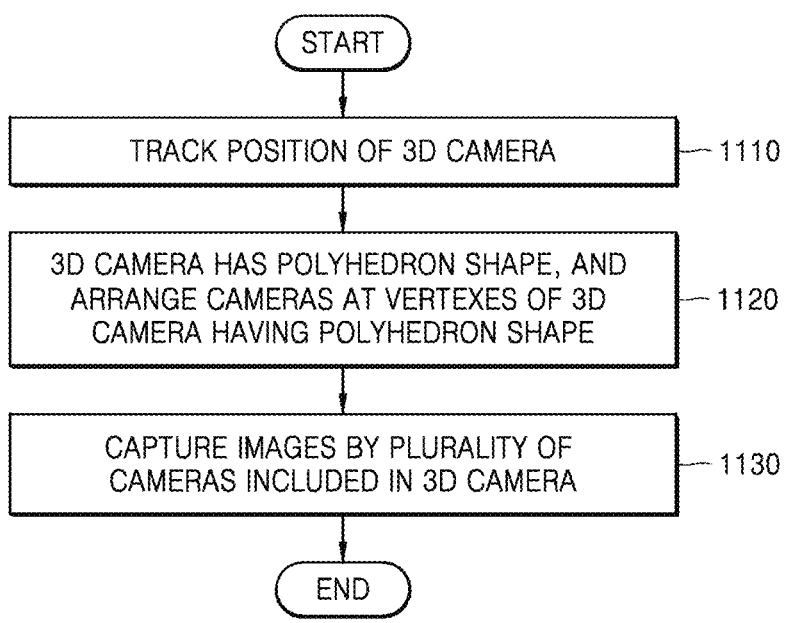
FIG. 11 is a flowchart of an image capturing method according to an embodiment.

FIG. 11 is a flowchart of an image capturing method according to an embodiment.

In operation 1110, a 3D camera tracks its own position. The 3D camera may move, and, when the 3D camera moves, a GPS, an IMU, or the like tracks a position of the 3D camera. The 3D camera may generate and store an index distribution map including a unique index representing a unique position. The 3D camera generates the index distribution map, based on a position of the 3D camera and an area occupied by the 3D camera, for example. For example, the 3D camera determines, as a unique position, a position where areas occupied by a polyhedron as the polyhedron moves do not overlap each other, and allocates an index representing the unique position to the polyhedron.

In operation 1120, since the 3D camera has a polyhedron shape, cameras are arranged at vertexes of the polyhedron shape. At least three 2D cameras may be arranged at a single vertex.

In operation 1130, a plurality of cameras included in the 3D camera capture images. The 3D camera may store only unique images captured at a position indicated by the unique index, from among the captured images. Cameras positioned at the same vertex capture images that overlap each other. Camera groups positioned to adjacent vertexes capture images that overlap each other. A distance between adjacent vertexes corresponds to a distance between the two eyes of a user. The field of view of a camera group at the same vertex may be 180° or more.

Apparatuses according to the present embodiments may include a processor, a memory for storing program data and executing it, a permanent storage unit such as a disk drive, a communications port for handling communications with external devices, and user interface devices, including a touch panel, keys, buttons, etc. For example, when software modules or algorithms are involved, these software modules may be stored as program instructions or computer readable codes executable on the processor in a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

The present embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on one or more processors. Furthermore, the present embodiment described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. It will be apparent to one of ordinary skill in the art that numerous modifications and adaptations may be made according to design conditions or factors without departing from the accompanying claims or their equivalents.

The invention claimed is:

1. A three-dimensional (3D) camera for capturing an image for providing virtual reality (VR), the 3D camera comprising:
   a plurality of cameras;
   a position sensor configured to track a position of the 3D camera, wherein the plurality of cameras are arranged at each vertex of a polyhedron, and at least three cameras are arranged at each vertex of the polyhedron;
   a processor configured to:
      generate an index distribution map including a unique index representing a unique position of the 3D camera, wherein the unique position indicates a position where areas occupied by polyhedrons formed by vertexes of the 3D camera do not overlap with each other, and wherein the vertexes of the 3D camera comprise the plurality of cameras, and
      determine a unique image captured at a position indicated by the unique index; and
   a memory configured to store the unique image.

2. The 3D camera of claim 1, wherein the plurality of cameras are arranged such that a field of view covered by the plurality of cameras is 180° or greater.

3. The 3D camera of claim 1, wherein a distance between vertexes of the polyhedron corresponds to a distance between two eyes of a user.

4. The 3D camera of claim 1, wherein the at least three cameras arranged at each vertex of the polyhedron capture a spherical panorama image.

5. The 3D camera of claim 1,
   wherein the processor is further configured to receive position information of the 3D camera from the position sensor and generate an index distribution map representing a position of the 3D camera.

6. The 3D camera of claim 1, wherein the 3D camera has a tetrahedron shape, and three two-dimensional (2D) cameras are arranged at each of four vertexes of the tetrahedron shape.

* * * * *